No. 632,441. Patented Sept. 5, 1899.
R. E. BYLE, H. A. FILLMORE & R. H. NICHOLSON.
PISTON.
(Application filed Nov. 25, 1898.)
(No Model.)
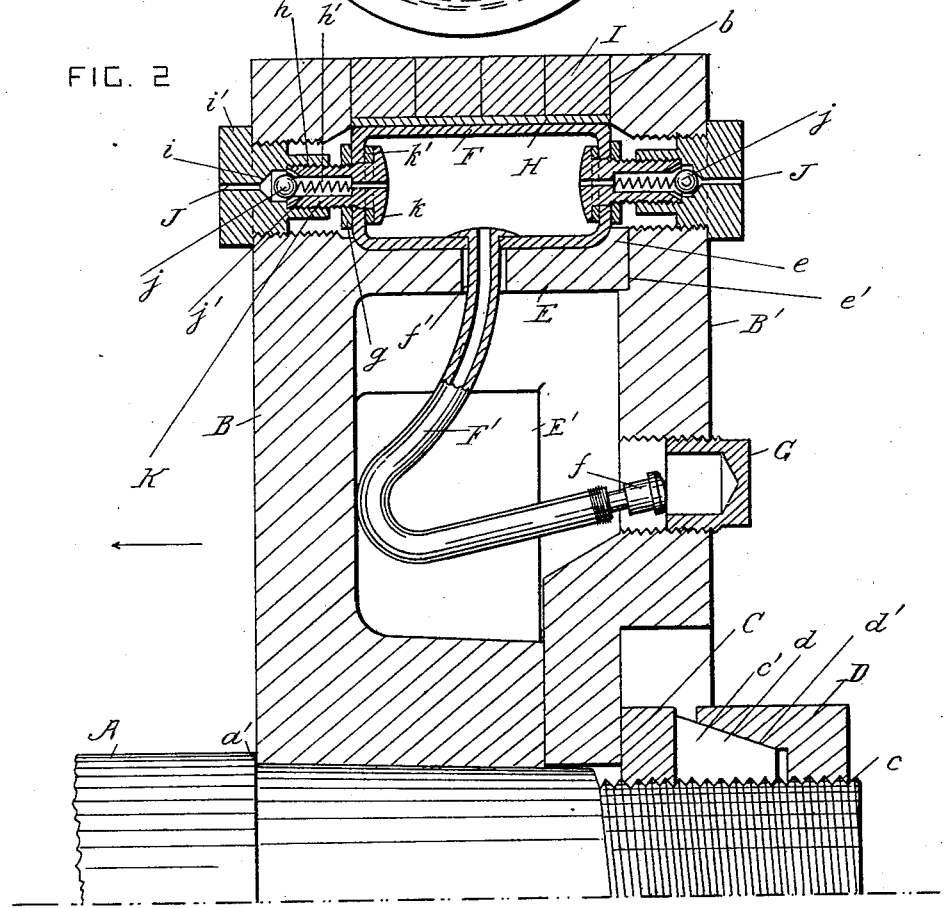
WITNESSES
INVENTORS
Robert E. Byle,
Harry A. Fillmore, and
Robert H. Nicholson.
by Herbert W. T. Jenner Attorney

UNITED STATES PATENT OFFICE.

ROBERT E. BYLE, HARRY A. FILLMORE, AND ROBERT H. NICHOLSON, OF WILKES-BARRÉ, PENNSYLVANIA.

PISTON.

SPECIFICATION forming part of Letters Patent No. 632,441, dated September 5, 1899.

Application filed November 25, 1898. Serial No. 697,400. (No model.)

*To all whom it may concern:*

Be it known that we, ROBERT E. BYLE, HARRY A. FILLMORE, and ROBERT H. NICHOLSON, citizens of the United States, residing at Wilkes-Barré, in the county of Luzerne and State of Pennsylvania, have invented certain new and useful Improvements in Pistons; and we do hereby declare the following to be a full, clear, and exact description of the invention, such as will enable others skilled in the art to which it appertains to make and use the same.

This invention relates to pistons; and it consists in the novel construction and combination of the parts hereinafter fully described and claimed.

In the drawings, Figure 1 is an end view of the piston with a portion of its cover-plate broken away to show the packing. Fig. 2 is a section through a portion of the piston, drawn to a larger scale.

A is the piston-rod.

B is the body of the piston, provided with a removable cover-plate B' on one side and a peripheral groove $b$ for the packing. The parts B and B' are secured together and to the piston-rod in any approved manner.

We prefer to form screw-threads $c$ on the end portion of the rod and to secure the piston by means of a nut C, which is provided with a conical projection having saw-cuts $c'$.

D is a locking-nut which also engages with the screw-threads $c$ and is provided with a conical socket $d'$, which engages with the projection $d$. The piston-rod is provided with a shoulder $a'$ for the piston to abut against, and when the nut D is screwed up it jams the nut C on the screw-threads and prevents it from working loose.

The piston-body is provided with a circular projecting flange or annular abutment E, which forms the bottom of the groove $b$, and the flange E has an outwardly-projecting lip or guard $e$ at its edge. The edge of the flange E engages with an annular recess $e'$ in the cover-plate B'.

E' are ribs for strengthening the flange E, formed on the body of the piston.

F is an inflatable tube which is seated in the groove $b$ of the piston. This tube is slipped over the lip $e$ onto the flange E before being inflated and before the cover-plate is secured in position. The tube F is formed of any approved elastic material or composition, such as india-rubber and canvas.

F' is an inflating-pipe provided with a check-valve $f$ (not shown) of any approved construction. The inflating-pipe is preferably passed through an opening $f'$ in the flange E and is arranged in the space within the body of the piston. G is a removable stopper or plug in the cover-plate for affording access to the end of the inflating-pipe.

H is a spring-band which encircles the tube F and which is provided with overlapping end portions, as shown in Fig. 1.

I is packing material inserted in the groove $b$ over the spring-band H. The packing I preferably consists of a series of rings of fibrous material arranged side by side. The spring-band is preferably arranged to press the packing against the cylinder, and the inflatable tube F also presses the packing outward. The tube F can be inflated or expanded with or by any approved fluid, such as air or water. The spring-band equalizes the action of the tube upon the packing-rings; but its use, although of great advantage, is not absolutely essential. The spring-band supports the packing when the tube is deflated and enables the packing to be placed in position without first inflating the tube.

Instead of inflating the tube F periodically through the pipe F' the tube F may be inflated or expanded automatically.

J is a lateral passage at the side of the piston which connects the interior of the tube F with the cylinder, in which the piston works. The passage J is provided with a valve $j$, which opens inwardly and which is normally held to its seat by a light spring $j'$. If desired, each side of the piston may have a similar passage and valve, so that the tube F is inflated from each end of the cylinder. The valve $j$ is preferably a ball, and its seat $i$ and the passage J are preferably formed in a plug $i'$, which is screwed into a hole in the side of the piston.

K is a tubular screw-threaded stem provided with a head $k$ and an india-rubber washer $k'$ on the inside of the tube F. A nut $g$ is screwed on the stem outside the tube F and secures the stem to the tube. The plug $i'$ has a screw-threaded projection $h$, which engages with the stem K, and the stem has a chamber $h'$ for the valve-spring $j'$ to work in. The stem has grooves where the valve strikes it, so that the fluid in the cylinder can pass through it into the tube F.

When the piston is used in a compressor or pump, the valve $j$ admits pressure to the tube F at each compression-stroke of the piston and holds the pressure in the tube F during the return stroke, and this pressure is available for expanding or setting up the packing, because the pressure of the fluid in the cylinder does not have as free an application or access to the outer surface of the packing as it does to its inner surface, and the effective pressure operating to press the packing outward is therefore in excess of the actual effective pressure, if any, between the packing and the cylinder, which tends to force the packing inward.

What we claim is—

1. The combination, with an annular ring of packing material, of an annular inflatable tube for setting up the said packing material, and a spring-band interposed between the said tube and packing material and supporting the said packing material when the tube is deflated, substantially as set forth.

2. The combination, with the body portion of a piston provided with an annular flange having a circumferential guard-lip $e$ at its edge, of a cover-plate secured against the said edge of the flange, and an annular inflatable tube seated on the said flange and retained thereon by the said guard-lip before the cover-plate is secured in position, substantially as set forth.

3. The combination, with the body portion of a piston provided with a circular flange having a circumferentially-projecting lip $e$ at its edge, and a cover-plate provided with a recess which engages with the said lip and the edge of the said flange; of an inflatable tube seated on the said flange, and packing material encircling the said tube, substantially as set forth.

4. The combination, with packing material, and an inflatable annular tube for setting it up; of a support for the said packing material and tube provided with a hole, a tubular screw-threaded stem secured to the said tube and projecting into the said hole, a plug provided with a valve-seat and engaging with the said hole and stem, a valve, and a spring normally holding the said valve to its seat, substantially as set forth.

5. The combination, with a piston provided with an annular abutment having an opening in it, of an inflatable tube seated on the said abutment and provided with an inflating-pipe of flexible material having a check-valve at its free end and projecting through the said opening into the internal space, packing material encircling the said tube, and a removable stopper at one side of the piston for giving access to the said inflating-pipe, substantially as set forth.

In testimony whereof we affix our signatures in presence of two witnesses.

ROBERT E. BYLE.
HARRY A. FILLMORE.
ROBERT H. NICHOLSON.

Witnesses:
JNO. B. RUSSELL,
G. W. REYNOLDS.